(12) United States Patent
Dar

(10) Patent No.: US 10,305,603 B2
(45) Date of Patent: May 28, 2019

(54) OPTICAL COMMUNICATION WITH SOME COMPENSATION OF NONLINEAR DISTORTIONS

(71) Applicant: Alcatel-Lucent USA Inc., Murray Hill, NJ (US)

(72) Inventor: Ronen Dar, Hoboken, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/475,300

(22) Filed: Mar. 31, 2017

(65) Prior Publication Data

US 2018/0287712 A1 Oct. 4, 2018

(51) Int. Cl.
*H04B 10/00* (2013.01)
*H04B 10/61* (2013.01)
*H04J 14/06* (2006.01)
*H04J 14/02* (2006.01)

(52) U.S. Cl.
CPC ..... *H04B 10/6163* (2013.01); *H04B 10/6161* (2013.01); *H04B 10/6162* (2013.01);
(Continued)

(58) Field of Classification Search
USPC ................................................ 398/202–214
See application file for complete search history.

(56) References Cited

U.S. PATENT DOCUMENTS 7,266,310 B1 9/2007 Savory et al.
7,636,525 B1 * 12/2009 Bontu .................... H04B 10/60
398/208
(Continued)

OTHER PUBLICATIONS

Rafique, Danish, et al., "Digital back-propagation for spectrally efficient WDM 112 Gbit/s PM m-ary QAM transmission," Optics Express, 2011, vol. 19, Issue 6, pp. 5219-5224.
(Continued)

*Primary Examiner* — Agustin Bello
(74) *Attorney, Agent, or Firm* — Mendelsohn Dunleavy, P.C.; Yuri Gruzdkov

(57) ABSTRACT

A WDM receiver configured to apply electronic equalization processing to both dispersion-compensated and dispersion-distorted versions of the received communication signal. In an example embodiment, the receiver's DSP first generates an equalized dispersion-compensated signal corresponding to the communication signal. The DSP then performs electronic dispersion-application processing on the equalized dispersion-compensated signal to generate a dispersion-distorted version thereof. The DSP then applies decision-aided electronic equalization processing to the dispersion-distorted version of the signal, subjects the resulting equalized signal to another round of dispersion-compensation processing, and recovers the data encoded in the communication signal using the resulting dispersion-compensated signal. This chain of signal processing tends to be effective in reducing nonlinear distortions of the intra-channel type and also some effects of nonlinear inter-channel interference, which advantageously enables the WDM receiver to support a lower BER and/or a higher data-transport capacity than those achievable with conventional WDM receivers.

22 Claims, 6 Drawing Sheets

(52) U.S. Cl.
CPC .......... *H04B 10/6166* (2013.01); *H04J 14/02* (2013.01); *H04J 14/06* (2013.01); *H04B 2210/252* (2013.01)

(56) References Cited

U.S. PATENT DOCUMENTS

| | | | |
|---|---|---|---|
| 7,747,177 | B2 | 6/2010 | Chen et al. |
| 8,036,541 | B2 | 10/2011 | Toyoshima et al. |
| 8,072,345 | B2 | 12/2011 | Chen et al. |
| 8,073,345 | B2 | 12/2011 | Chen et al. |
| 8,260,154 | B2 | 9/2012 | Chang et al. |
| 8,805,209 | B2 | 8/2014 | Li et al. |
| 9,020,364 | B2 | 4/2015 | Xie et al. |
| 9,112,614 | B2 | 8/2015 | Randel et al. |
| 9,225,455 | B2 | 12/2015 | Yu et al. |
| 9,590,731 | B2 * | 3/2017 | Roberts ................ H04B 10/677 |
| 2002/0012152 | A1 * | 1/2002 | Agazzi ................ H03M 1/0624 398/202 |
| 2013/0230312 | A1 * | 9/2013 | Randel ................ H04B 10/611 398/25 |
| 2014/0086594 | A1 * | 3/2014 | Xie ................ H04B 10/6161 398/208 |
| 2015/0372764 | A1 | 12/2015 | Kaneda |

OTHER PUBLICATIONS

Zhu, Likai, et al., "Folded digital backward propagation for dispersion-managed fiber-optic transmission," Optics Express, 2011, vol. 19, Issue 7, pp. 5953-5959.

Rafique, Danish, et al., "Compensation of intra-channel nonlinear fibre impairments using simplified digital back-propagation algorithm," Optics Express, 2011, vol. 19, Issue 10, pp. 9453-9460.

Asif, Rameez et al., "Digital Backward Propagation: A Technique to Compensate Fiber Dispersion and Non-Linear Impairments," e-book "Applications of Digital Signal Processing," Dr. Christian Cuadrado-Laborde (Ed.), 2011, InTech, DOI: 10.5772/25410, Chapter 2, pp. 25-50.

Secondini, M. et al., "Coherent 100G Nonlinear Compensation with Single-Step Digital Backpropagation," International Conference on Optical Network Design and Modeling (ONDM), 2015, (5 pages).

Zhang, Fangyuan, et al., "Advanced and Low-Complexity Digital Backpropagation for Subcarrier-Multiplexing Systems," Optical Fiber Communications Conference and Exhibition (OFC), 2015, (3 pages).

De Jesús, Orlando et al., "Backpropagation Algorithms for a Broad Class of Dynamic Networks," IEEE Transactions on Neural Networks, 2007, vol. 18, No. 1, pp. 14-27.

Ip, Ezra, et al., "Compensation of Dispersion and Nonlinear Impairments Using Digital Backpropagation," Journal of Lightwave Technology, 2008, vol. 26, No. 20, pp. 3416-3425.

Liga, Gabriele, et al., "Digital Back-Propagation for High Spectral-Efficiency Terabit/s Superchannels," Optical Fiber Communication Conference OSA Technical Digest, Optical Society of America, paper W2A.23, 2014, (3 pages).

* cited by examiner

100

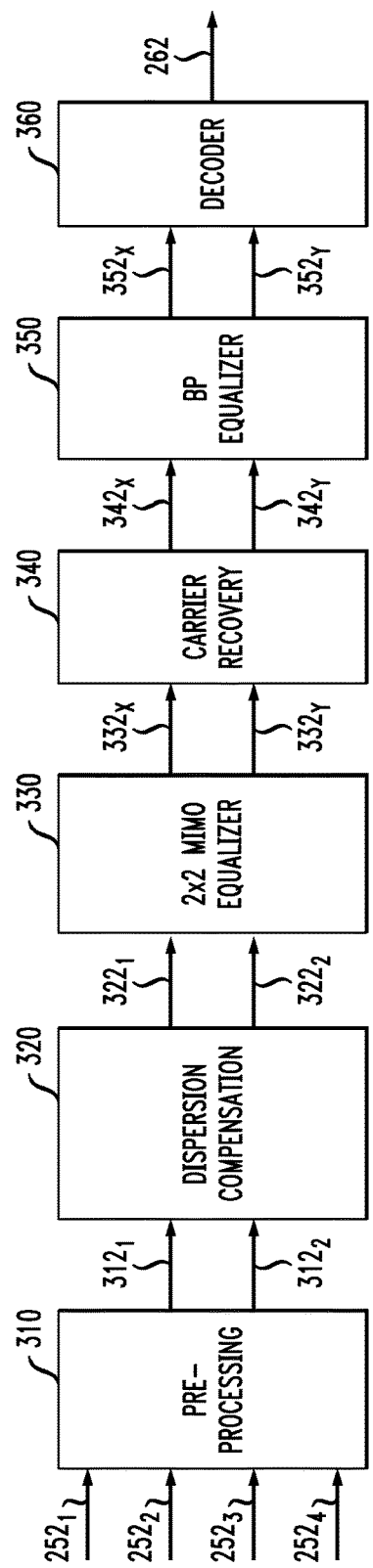

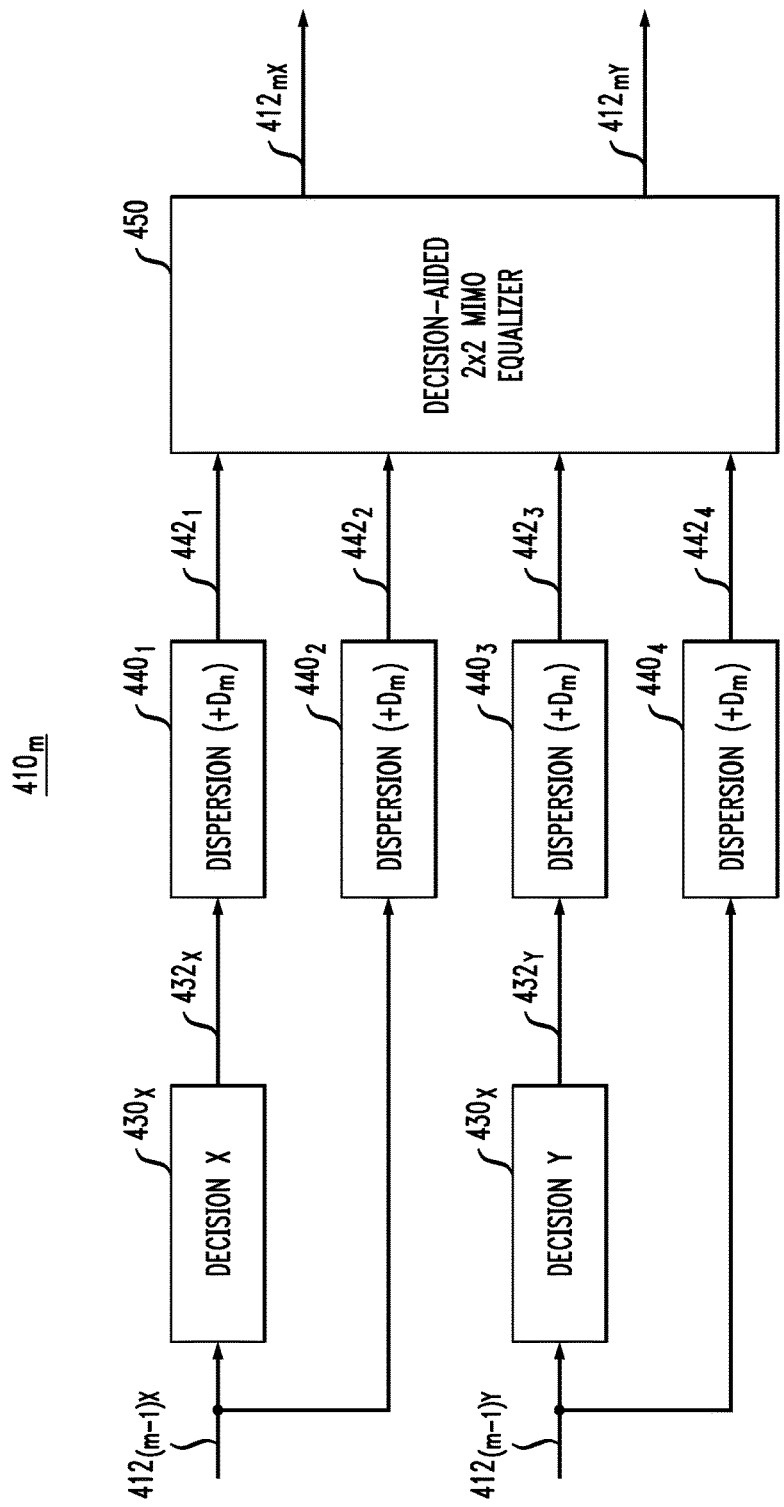

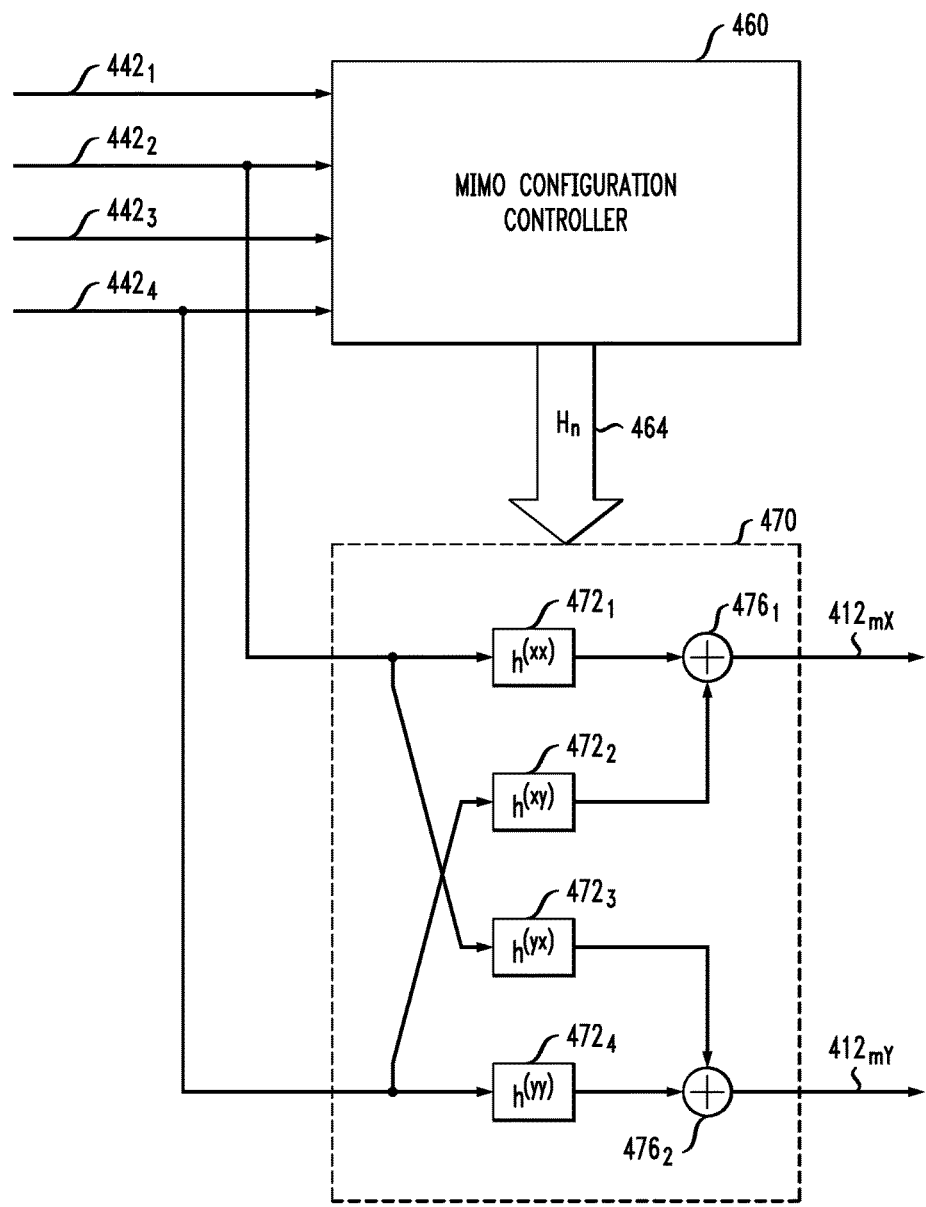

OPTICAL COMMUNICATION WITH SOME COMPENSATION OF NONLINEAR DISTORTIONS

BACKGROUND

Field

The present disclosure relates to optical communication equipment and, more specifically but not exclusively, to at least partial compensation of nonlinear distortions.

Description of the Related Art

This section introduces aspects that may help facilitate a better understanding of the disclosure. Accordingly, the statements of this section are to be read in this light and are not to be understood as admissions about what is in the prior art or what is not in the prior art.

After propagating through a length of optical fiber, the received optical signal may be distorted due to linear impairments, such as chromatic dispersion (CD) and polarization mode dispersion (PMD), and nonlinear impairments, such as the Kerr effect, including one or more of self-phase modulation (SPM), cross-phase modulation (XPM), and four-wave mixing (FWM). Nonlinear distortions can be categorized as being of the intra-channel type or inter-channel type. Intra-channel distortions affect an individual wavelength-division-multiplexed (WDM) channel substantially independently of the other WDM channels. In contrast, inter-channel distortions are those in which a given WDM channel is affected by the electric fields of the other WDM channels propagating in the same fiber at the same time. Since nonlinear distortions of both types can cause a detrimental increase in the bit-error rate (BER), optical and electrical signal-processing techniques that can reduce this BER penalty are desirable.

SUMMARY OF SOME SPECIFIC EMBODIMENTS

Disclosed herein are various embodiments of a WDM receiver configured to apply electronic equalization processing to both dispersion-compensated and dispersion-distorted versions of the received communication signal. In an example embodiment, the receiver's DSP first generates an equalized dispersion-compensated signal corresponding to the communication signal. The DSP then performs electronic dispersion-application processing on the equalized dispersion-compensated signal to generate a dispersion-distorted version thereof. The DSP then applies decision-aided electronic equalization processing to the dispersion-distorted version of the signal, subjects the resulting equalized signal to another round of dispersion-compensation processing, and recovers the data encoded in the communication signal using the resulting dispersion-compensated signal. This chain of signal processing tends to be effective in reducing nonlinear distortions of the intra-channel type and also some effects of nonlinear inter-channel interference, which advantageously enables the WDM receiver to support a lower BER and/or a higher data-transport capacity than those achievable with conventional WDM receivers.

According to one embodiment, provided is an apparatus comprising: an optical front-end circuit configured to receive an optical communication signal; and a signal processor operatively connected to the optical front-end circuit and configured to: perform dispersion-compensation processing on digital samples representing the optical communication signal to generate a first dispersion-compensated digital signal; apply equalization processing to the first dispersion-compensated digital signal to generate a first equalized digital signal; perform dispersion-application processing on the first equalized digital signal to generate a dispersed digital signal; and apply equalization processing to the dispersed digital signal to generate a second equalized digital signal.

According to another embodiment, provided is a machine-implemented signal-processing method comprising the steps of: performing dispersion-compensation processing on digital samples representing an optical communication signal to generate a first dispersion-compensated digital signal; applying equalization processing to the first dispersion-compensated digital signal to generate a first equalized digital signal; performing dispersion-application processing on the first equalized digital signal to generate a dispersed digital signal; and applying equalization processing to the dispersed digital signal to generate a second equalized digital signal.

BRIEF DESCRIPTION OF THE DRAWINGS

Other aspects, features, and benefits of various disclosed embodiments will become more fully apparent, by way of example, from the following detailed description and the accompanying drawings, in which:

FIG. 3 shows a block diagram of a digital signal processor that can be used in the optical receiver of FIG. 2 according to an embodiment; and FIGS. 4A-4C show block diagrams of an equalizer that can be used in the digital signal processor of FIG. 3 according to an embodiment.

DETAILED DESCRIPTION

Figure 1:
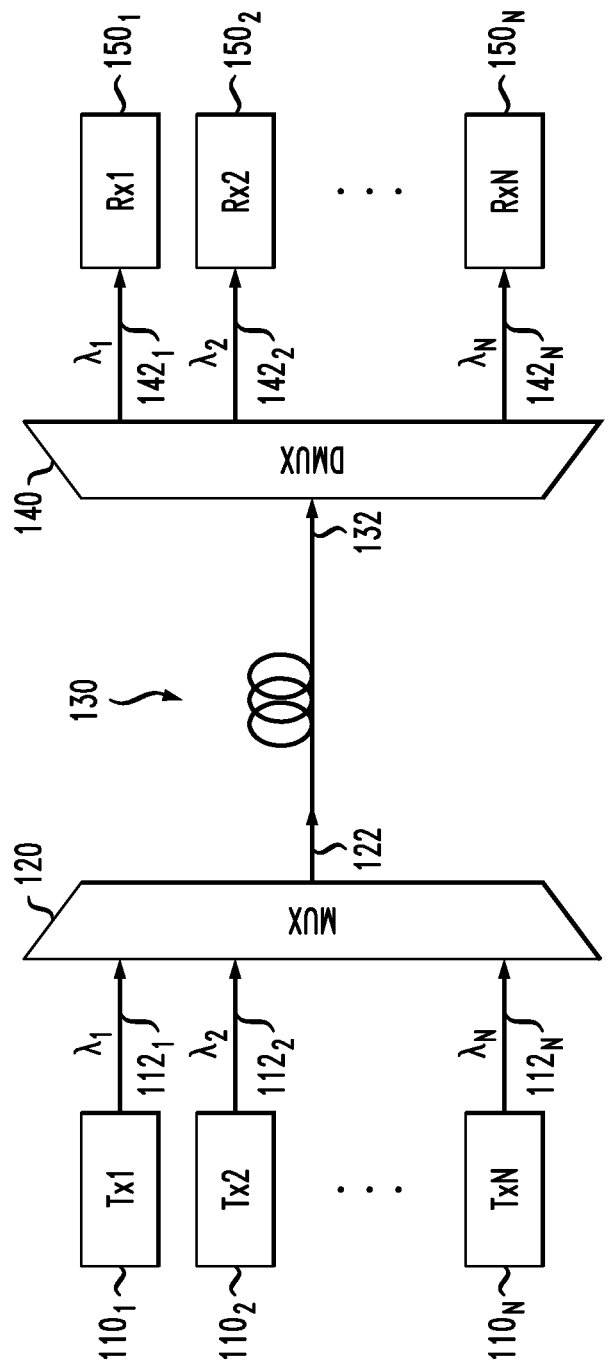
FIG. 1 shows a WDM system in which various embodiments can be practiced.

FIG. 1 shows a WDM system 100 in which various embodiments can be practiced. System 100 comprises a plurality of optical transmitters $110_1$-$110_N$ and a plurality of optical receivers $150_1$-$150_N$ that are optically coupled by way of an optical transport link 130. Each of optical transmitters $110_1$-$110_N$ operates to generate a respective one of modulated optical signals $112_1$-$112_N$ using a respective one of carrier wavelengths $\lambda_1$-$\lambda_N$. A wavelength multiplexer (MUX) 120 operates to optically multiplex modulated optical signals $112_1$-$112_N$ and then apply a resulting WDM signal 122 to optical transport link 130 for transmission to optical receivers $150_1$-$150_N$. After propagating through optical transport link 130, WDM signal 122 becomes a WDM signal 132, which is applied to a wavelength demultiplexer (DMUX) 140. WDM signal 132 may differ from WDM signal 122, e.g., because optical transport link 130 typically adds noise and imposes various linear and nonlinear signal distortions, such as those caused by the above-mentioned Kerr effect, CD, and PMD. DMUX 140 operates to optically demultiplex WDM signal 132 and apply the resulting modulated optical signals $142_1$-$142_N$ of different respective carrier wavelengths $\lambda_i$ to optical receivers $150_1$-$150_N$ for detection and decoding therein.

In various embodiments, optical transport link 130 may include some or all of the following: (i) a section of optical fiber or fiber-optic cable; (ii) an optical amplifier; (iii) a reconfigurable optical add-drop multiplexer (ROADM); (iv) an optical filter; and (v) an optical switch. Except for the optical fiber, other possible components of optical transport link 130 are not explicitly shown in FIG. 1 for clarity of depiction.

In operation, optical transport link 130 typically causes some or all of modulated optical signals $142_1$-$142_N$ to be distorted, inter alia, due to inter-channel interference (ICI). Some nonlinear distortions caused by the ICI manifest themselves as phase noise and/or polarization crosstalk and, as such, can be mitigated at the respective optical receiver 150, e.g., using conventional adaptive-equalization techniques. Some other nonlinear distortions caused by the ICI are more complex in nature and are typically treated in conventional WDM systems as random non-removable noise. An example of the latter nonlinear distortions includes some detrimental effects of XPM and/or FWM. The latter detrimental effects can be a source of a significant BER penalty that can disadvantageously limit the performance of conventional WDM systems.

At least some of these and other related problems in the state of the art are addressed by embodiments disclosed herein. More specifically, in an example embodiment, an optical receiver 150 is configured to apply electronic equalization processing that is capable of at least partially compensating some ICI components, such as those caused by XPM and FWM in optical transport link 130. As a result, system 100 is advantageously capable of achieving a lower BER and/or a higher data-transport capacity than a comparable conventional WDM system.

Figure 2:
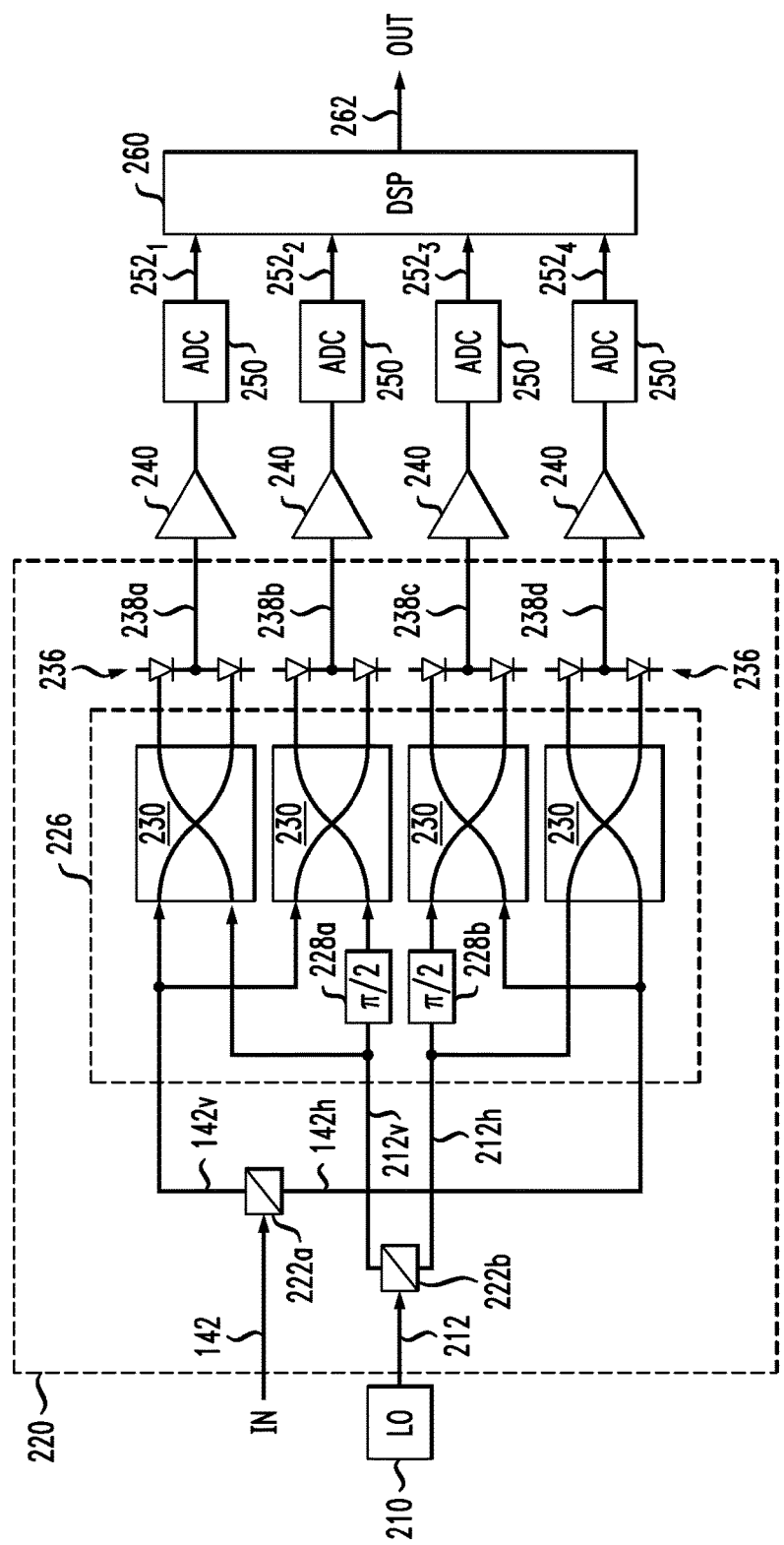
FIG. 2 shows a block diagram of an optical receiver that can be used in the WDM system of FIG. 1 according to an embodiment.

FIG. 2 shows a block diagram of optical receiver 150 that can be used in system 100 according to an embodiment. Optical receiver 150 is configured to receive a corresponding optical polarization-division multiplexed (PDM) input signal 142 (also see FIG. 1) having the corresponding carrier wavelength $\lambda_i$. Optical input signal 142 is applied to an optical-to-electrical (O/E) converter 220 that operates to convert that optical signal into four analog electrical signals 238a-238d. Each of signals 238a-238d may be amplified in a corresponding amplifier 240 coupled to a corresponding analog-to-digital converter (ADC) 250. Each ADC 250 samples the output of the corresponding amplifier 240 at an appropriate sampling rate to generate a corresponding one of four digital electrical signals $252_1$-$252_4$. Digital signals $252_1$-$252_4$ are then applied to a digital signal processor (DSP) 260 that processes them, e.g., as described in more detail below in reference to FIGS. 3-4, to recover the data encoded onto the PDM components of optical input signal 142 at the corresponding optical transmitter 110 (FIG. 1). DSP 260 then outputs the recovered data via an output signal 262.

O/E converter 220 implements a polarization-diversity intradyne-detection scheme using an optical local-oscillator (LO) signal 212 generated by an optical LO source 210. Polarization beam splitters 222a and 222b decompose signals 142 and 212, respectively, into two respective orthogonally polarized components, illustratively vertically (v–) polarized components 142v and 212v and horizontally (h–) polarized components 142h and 212h. These polarization components are then directed to an optical hybrid 226.

In optical hybrid 226, each of polarization components 142v, 212v, 142h, and 212h is split into two (attenuated) copies, e.g., using a conventional 3-dB power splitter (not explicitly shown in FIG. 2). A relative phase shift of about 90 degrees ($\pi/2$ radian) is then applied to one copy of component 212v and one copy of component 212h using phase shifters 228a and 228b, respectively. The various copies of signals 142v, 212v, 142h, and 212h are optically mixed with each other using four optical signal mixers 230, and the mixed optical signals produced by the optical signal mixers are detected by eight photo-detectors (e.g., photodiodes) 236. Photo-detectors 236 are arranged in pairs, as shown in FIG. 2, and the output of each photo-detector pair is a corresponding one of electrical signals 238a-238d.

DSP 260 is configured to perform, inter alia, one or more of the following: (i) signal processing directed at dispersion compensation; (ii) signal processing directed at compensation of nonlinear distortions; (iii) electronic polarization de-multiplexing; (iv) digital signal equalization; (v) phase/carrier recovery; (vi) electronic backward-propagation (BP) processing; (vii) data recovery; and (viii) forward error correction based on the encoding (if any) applied at the corresponding optical transmitter 110. Some of the signal processing implemented at DSP 260 is capable of at least partially compensating the detrimental effects of ICI. Example embodiments of DSP 260 are described in more detail below in reference to FIGS. 3-4.

FIG. 3 shows a block diagram of DSP 260 (FIG. 2) according to an embodiment. Digital signals $252_1$-$252_4$ and output data stream 262 are also shown in FIG. 3 to better illustrate the relationship between the circuits shown in FIGS. 2 and 3.

Ideally, digital signals $252_1$ and $252_2$ represent the I and Q components, respectively, of the horizontal polarization component of optical signal 142, and digital signals $252_3$ and $252_4$ represent the I and Q components, respectively, of the vertical polarization component of that optical signal. However, various transmission impairments, front-end implementation imperfections, and configuration inaccuracies generally cause each of digital signals $252_1$-$252_4$ to be a convoluted signal that has various linear and nonlinear distortions and/or contributions from different signal components originally generated at one or more of transmitters $110_1$-$110_N$ (FIG. 1). The train of signal processing implemented in DSP 260 is generally directed at reducing the adverse effects of the signal distortions and de-convolving digital signals $252_1$-$252_4$ so that the transmitted data can be properly recovered to generate output data stream 262 with an acceptably low BER.

DSP 260 comprises a signal-pre-processing module 310 configured to receive digital signals $252_1$-$252_4$. One of the functions of module 310 may be to adapt the signal samples received via digital signals $252_1$-$252_4$ to a form that is more suitable for the signal-processing algorithms implemented in the downstream modules of DSP 260. For example, module 310 may be configured to (i) resample digital signals $252_1$-$252_4$ such that each of these signals carries two samples per symbol period and/or (ii) convert real-valued signal samples into the corresponding complex-valued signal samples. The resulting complex-valued digital signals generated by signal-pre-processing module 310 are labeled $312_1$-$312_2$.

Complex-valued digital signals $312_1$ and $312_2$ are applied to a dispersion-compensation module 320 for dispersion-compensation processing therein, and the resulting dispersion-compensated signals are complex-valued digital signals $322_1$-$322_2$. For example, the total amount of chromatic dispersion, $CD_t$, compensated by dispersion-compensation module 320 can be expressed as follows:

$$CD_t = D_e \times L_0 \qquad (1)$$

where $D_e$ is the effective dispersion coefficient; and $L_0$ is the length of optical fiber used in optical transport link 130. Example circuits that can be used to implement dispersion-compensation module 320 are disclosed, e.g., in U.S. Pat. Nos. 8,260,154, 7,636,525, 7,266,310, all of which are incorporated herein by reference in their entirety.

Digital signals $322_1$ and $322_2$ are applied to a 2×2 MIMO (multiple-input/multiple-output) equalizer 330 for MIMO-equalization processing therein, and the resulting equalized signals are complex-valued digital signals $332_X$ and $332_Y$. In an example embodiment, equalizer 330 can be a butterfly equalizer configured to perform electronic polarization demultiplexing and reduce some effects of inter-symbol interference. Example 2×2 MIMO equalizers that can be used to implement equalizer 330 are disclosed, e.g., in U.S. Pat. No. 9,020,364 and U.S. Patent Application Publication No. 2015/0372764, both of which are incorporated herein by reference in their entirety.

Digital signals $332_X$ and $332_Y$ generated by equalizer 330 are applied to a carrier-recovery module 340 that is configured to perform signal processing generally directed at (i) compensating the frequency mismatch between the carrier frequencies of optical LO signal 212 and input signal 142 and/or (ii) reducing the effects of phase noise. Various signal-processing techniques that can be used to implement the frequency-mismatch-compensation processing in carrier-recovery module 340 are disclosed, e.g., in U.S. Pat. Nos. 7,747,177 and 8,073,345, both of which are incorporated herein by reference in their entirety. Example signal-processing techniques that can be used to implement phase-error-correction processing in carrier-recovery module 340 are disclosed, e.g., in U.S. Pat. No. 9,112,614, which is incorporated herein by reference in its entirety.

Digital signals $342_X$ and $342_Y$ generated by carrier-recovery module 340 are applied to a BP equalizer 350 that converts these digital signals into digital signals $352_X$ and $352_Y$, respectively. In operation, BP equalizer 350 uses decision-aided equalization of a dispersed version of digital signals $342_X$ and $342_Y$, which tends to remove the residual nonlinear distortions that have not been removed by the signal processing performed by equalizer 330 and carrier-recovery module 340 on the dispersion-compensated version of the signals. Numerical simulations show that equalization of both dispersion-compensated and dispersion-distorted versions of the signal, such as that implemented in DSP 260, is effective in at least partially removing nonlinear distortions of both intra- and inter-channel types. As a result, in addition to being capable of mitigating the adverse effects of nonlinear intra-channel distortions, optical receiver 150 is capable of significantly reducing the adverse effects of nonlinear ICI, thereby advantageously providing a capability for achieving a lower BER and/or a higher data-transport capacity than those achievable with conventional WDM receivers.

Example embodiments of BP equalizer 350 are described in more detail below in reference to FIGS. 4A-4C. The general principles of digital BP and split-step Fourier method (SSFM), as applied to optical communications, are reviewed in a paper by Rameez Asif, Chien-Yu Lin, and Bernhard Schmauss, entitled "Digital Backward Propagation: A Technique to Compensate Fiber Dispersion and Non-Linear Impairments," published as Chapter 2 in the e-book "Applications of Digital Signal Processing," Dr. Christian Cuadrado-Laborde (Ed.), InTech, DOI: 10.5772/25410, which paper is incorporated herein by reference in its entirety. Certain embodiments of BP equalizer 350 may benefit from the use of some aspects of the digital BP techniques disclosed, e.g., in U.S. Pat. Nos. 8,036,541, 8,805,209, and 9,225,455, all of which are incorporated herein by reference in their entirety.

Digital signals $352_X$ and $352_Y$ generated by BP equalizer 350 are applied to a decoder 360. In an example embodiment, decoder 360 is configured to use the complex values conveyed by digital signals $352_X$ and $352_Y$ to appropriately map each complex value onto the operative constellation to determine the corresponding received symbol and, based on said mapping, determine the corresponding bit-word encoded by the symbol. Decoder 360 then appropriately multiplexes and concatenates the determined bit-words to generate output data stream 262.

In some embodiments, decoder 360 can also be configured to perform forward-error-correction (FEC) processing using data redundancies (if any) in the data carried by the corresponding optical signal 142.

Experiments and computer simulations indicate that the use of BP equalizer 350 beneficially enables DSP 260 to provide an additional signal-to-noise ratio (SNR) gain of up to ~0.8 dB compared to a configuration of the same DSP in which BP equalizer 350 is disabled or removed from the corresponding chain of signal processing. For example, in an embodiment of system 100 employing twenty-one WDM channels for transmission of data encoded using a 16-QAM constellation over a 960-km optical transport link 130, the additional SNR gain provided by the use of BP equalizer 350 can be ~0.5 dB at the optimum launch power of WDM signal 122. In the same embodiment of system 100, but employing a QPSK constellation instead of the 16-QAM constellation, the additional SNR gain provided by the use of BP equalizer 350 can be ~0.8 dB.

Figure 4A:
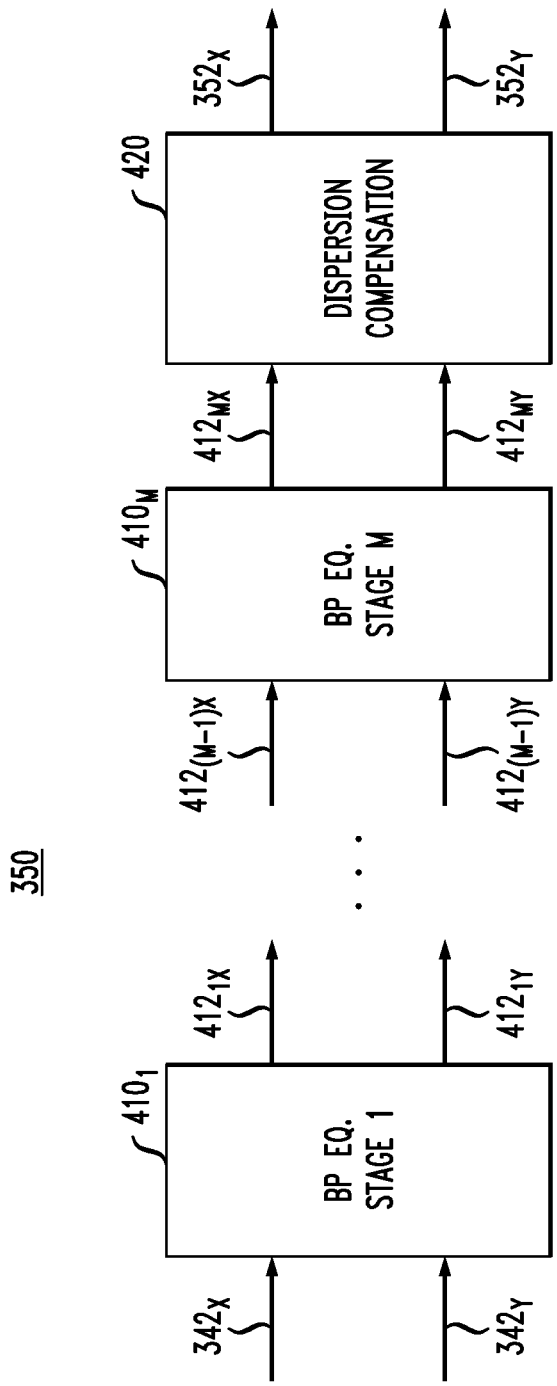

FIGS. 4A-4C show block diagrams of BP equalizer 350 according to an embodiment. More specifically, FIG. 4A shows an overall block diagram of BP equalizer 350. FIG. 4B shows a block diagram of a BP stage $410_m$, one or more of which can be used in BP equalizer 350 of FIG. 4A. FIG. 4C shows a block diagram of a decision-aided 2×2 MIMO equalizer 450 used in BP stage $410_m$ of FIG. 4B.

In the embodiment shown in FIG. 4A, BP equalizer 350 has M BP stages $410_1$-$410_M$, where M is an integer greater than one. In some embodiments, BP equalizer 350 may have a single BP stage (which corresponds to M=1). For illustration purposes and without any implied limitations, the subsequent description of BP equalizer 350 is given below in reference to an embodiment corresponding to M>1.

BP stage $410_1$ of BP equalizer 350 is configured to receive digital signals $342_X$ and $342_Y$ from carrier-recovery module 340 and generate digital signals $412_{1X}$ and $412_{1Y}$ that are applied to BP stage $410_2$ (not explicitly shown in FIG. 4A for embodiments corresponding to M≠2). BP stage $410_M$ is configured to receive digital signals $412_{(M-1)X}$ and $412_{(M-1)Y}$ from BP stage $410_{M-1}$ (not explicitly shown in FIG. 4A for embodiments corresponding to M≠2) and generate digital signals $412_{MX}$ and $412_{MY}$ that are applied to a dispersion-compensation module 420. Intermediate BP stages (if any, not explicitly shown in FIG. 4A) are serially connected between BP stages $410_1$ and $410_M$ and are configured to operate in a similar manner.

FIG. 4B shows an example block diagram of a BP stage $410_m$, where 1<m≤M. BP stage $410_1$ may have a similar block diagram, except that, instead of receiving digital signals $412_{(m-1)X}$ and $412_{(m-1)Y}$ from the preceding BP stage $410_{m-1}$, BP stage $410_1$ is configured to receive digital signals $342_X$ and $342_Y$ from carrier-recovery module 340 as shown in FIG. 4A. As indicated in FIG. 4B, each of BP stages $410_1$-$410_M$ comprises: (i) respective decision circuits $430_X$ and 430$_Y$; (ii) respective dispersion-application modules 440$_1$-440$_4$; and (iii) respective decision-aided 2×2 MIMO equalizer 450.

Decision circuit 430$_X$ operates to map each complex value supplied by digital signal 412$_{(m-1)X}$ (or 342$_X$ for m=1) onto the operative constellation to determine the corresponding constellation symbol and then output, by way of a digital signal 432$_X$, a corresponding complex value that represents that constellation symbol in the operative constellation. Decision circuit 430$_Y$ similarly operates to map each complex value supplied by digital signal 412$_{(m-1)Y}$ (or 342$_Y$ for m=1) onto the operative constellation to determine the corresponding constellation symbol and then output, by way of a digital signal 432$_Y$, a corresponding complex value that represents that constellation symbol in the operative constellation.

Each of dispersion-application modules 440$_1$-440$_4$ of BP stage 410$_m$ operates to transform the input sequence of complex values supplied by the respective digital input signal into a corresponding output sequence of complex values by applying thereto a digital transformation that approximates the effects of chromatic dispersion in the amount of CD$_m$, with the individual values CD$_m$ being selected such that:

$$CD_t = \sum_{m=1}^{M} CD_m \quad (2)$$

where CD$_t$ is the total amount of chromatic dispersion applied to the corresponding optical signal 142 by optical transport link 130 (also see Eq. (1)). The input signal received by dispersion-application module 440$_1$ is digital signal 432$_X$. The input signal received by dispersion-application module 440$_2$ is digital signal 412$_{(m-1)X}$ (or 342$_X$ for m=1). The input signal received by dispersion-application module 440$_3$ is digital signal 432$_Y$. The input signal received by dispersion-application module 440$_4$ is digital signal 412$_{(m-1)Y}$ (or 342$_Y$ for m=1). The output sequences generated by dispersion-application modules 440$_1$-440$_4$ are carried by digital signals 442$_1$-442$_4$, respectively. Note that a dispersion-application module 440 operates to perform a qualitatively inverse operation to that applied by a dispersion-compensation module, such as dispersion-compensation module 320 (FIG. 3) or 420 (FIG. 4A).

In some embodiments, dispersion-application modules 440$_1$-440$_4$ of different BP stages 410$_m$ can be configured to apply equal amounts of dispersion. In other words, in such embodiments, CD$_m$=CD$_t$/M, for each m. In some other embodiments, dispersion-application modules 440$_1$-440$_4$ of different BP stages 410$_m$ can be configured to apply different respective amounts of dispersion constrained by Eq. (2).

FIG. 4C shows an example block diagram of decision-aided 2×2 MIMO equalizer 450 used in BP stage 410$_m$ of FIG. 4B. Equalizer 450 comprises a 2×2 MIMO equalizer 470 and a MIMO configuration controller 470. Equalizer 470 applies equalization processing to digital signals 442$_2$ and 442$_4$ to generate digital signals 412$_{mX}$ and 412$_{mY}$ (also see FIG. 4B). Controller 470 operates to set and dynamically update the configurations of finite-impulse-response (FIR) filters 472$_1$-472$_4$ used in equalizer 470 based on digital signals 442$_1$-442$_4$ (also see FIG. 4B).

FIR filters 472$_1$-472$_4$ and adders 476$_1$ and 476$_2$ of equalizer 470 are connected in a butterfly configuration and operate to convert digital signals 442$_2$ and 442$_4$ into digital signals 412$_{mX}$ and 412$_{mY}$ in accordance with Eqs. (3a) and (3b):

$$x_n^{(e)} = h_n^{(xx)} x_n + h_n^{(xy)} y_n \quad (3a)$$

$$y_n^{(e)} = h_n^{(yx)} x_n + h_n^{(yy)} y_n \quad (3b)$$

where the subscript n indicates the time slot; $x_n^{(e)}$ is the complex value in the n-th time slot of digital signal 412$_{mX}$; $y_n^{(e)}$ is the complex value in the n-th time slot of digital signal 412$_{mY}$; $x_n$ is the complex value in the n-th time slot of digital signal 442$_2$; $y_n$ is the complex value in the n-th time slot of digital signal 442$_4$; and $h_n^{(xx)}$, $h_n^{(xy)}$, $h_n^{(yx)}$, and $h_n^{(yy)}$ are the corresponding equalization coefficients applied to the corresponding complex values by filters 472$_1$-472$_4$, respectively. Controller 470 operates to (i) compute the equalization coefficients $h_n^{(xx)}$, $h_n^{(xy)}$, $h_n^{(yx)}$, and $h_n^{(yy)}$ and (ii) supply the computed equalization coefficients to equalizer 470 by way of a configuration-control signal 464. In an example embodiment, controller 470 can be configured to compute the coefficients $h_n^{(xx)}$, $h_n^{(xy)}$, $h_n^{(yx)}$, and $h_n^{(yy)}$ accordance with Eq. (4):

$$H_n = \begin{pmatrix} h_n^{(xx)} & h_n^{(xy)} \\ h_n^{(yx)} & h_n^{(yy)} \end{pmatrix} = \left( \sum_{j=n-L}^{n+L} \begin{bmatrix} \hat{x}_j \\ \hat{y}_j \end{bmatrix} [\hat{x}_j^* \; \hat{y}_j^*] \right)^{-1} \sum_{j=n-L}^{n+L} \begin{bmatrix} x_j \\ y_j \end{bmatrix} [\hat{x}_j^* \; \hat{y}_j^*] \quad (4)$$

where H$_n$ is a 2×2 matrix whose four matrix elements are the equalization coefficients $h_n^{(xx)}$, $h_n^{(xy)}$, $h_n^{(yx)}$, and $h_n^{(yy)}$; $\hat{x}_j$ is the complex value in the j-th time slot of digital signal 442$_1$; $\hat{y}_j$ is the complex value in the j-th time slot of digital signal 442$_3$; $x_j$ is the complex value in the j-th time slot of digital signal 442$_2$; $y_j$ is the complex value in the j-th time slot of digital signal 442$_4$; and (2L+1) is the length of the sliding window used in the computation of the matrices H$_n$.

A person of ordinary skill in the art will understand that equalizer 450 operates to perform polarization demultiplexing that tends to reduce or remove the residual polarization crosstalk present in digital signals 442$_2$ and 442$_4$. At least some of this residual polarization crosstalk tends to be induced by the effects of nonlinear ICI in optical transport link 130.

Referring back to FIG. 4A, as already indicated above, the total amount of dispersion applied by BP stages 410$_1$-410$_M$ in the process of generating digital signals 412$_{MX}$ and 412$_{MY}$ is CD$_t$ (also see Eq. (2)). Dispersion-compensation module 420, which follows BP stages 410$_1$-410$_M$ in the chain of signal processing implemented in BP equalizer 350, operates to compensate this total amount of dispersion, thereby substantially canceling possible adverse effects of the dispersion applied by dispersion-application modules 440$_1$-440$_4$ of BP stages 410$_1$-410$_M$ on digital output signals 352$_X$ and 352$_Y$ generated by BP equalizer 350. In some embodiments, dispersion-compensation module 420 can be a nominal copy of dispersion-compensation module 320 (FIG. 3).

According to an example embodiment disclosed above in reference to FIGS. 1-4, provided is an apparatus (e.g., 100, FIG. 1) comprising: an optical front-end circuit (e.g., 210-250, FIG. 2) configured to receive an optical communication signal (e.g., 142, FIGS. 1-2); and a signal processor (e.g., 260, FIGS. 2-3) operatively connected to the optical front-end circuit and configured to: perform dispersion-compensation processing (e.g., using 320, FIG. 3) on digital samples (e.g., 312, FIG. 3) representing the optical communication signal to generate a first dispersion-compensated digital signal (e.g., 322, FIG. 3); apply equalization processing (e.g., using 330/340, FIG. 3) to the first dispersion-compensated digital signal to generate a first equalized digital signal (e.g., 342, FIG. 3); perform dispersion-application processing (e.g., using 440, FIG. 4B) on the first equalized digital signal to generate a dispersed digital signal (e.g., 442, FIG. 4B); and apply equalization processing (e.g., using 450, FIG. 4B) to the dispersed digital signal to generate a second equalized digital signal (e.g., 412, FIG. 4A).

In some embodiments of the above apparatus, the signal processor is further configured to recover data (e.g., using 360, FIG. 3) encoded in the optical communication signal using the second equalized digital signal.

In some embodiments of any of the above apparatus, the signal processor is further configured to perform dispersion-compensation processing (e.g., using 420, FIG. 4) on the second equalized digital signal to generate a second dispersion-compensated digital signal (e.g., 352, FIG. 3).

In some embodiments of any of the above apparatus, the signal processor is further configured to recover data (e.g., using 360, FIG. 3) encoded in the optical communication signal using the second dispersion-compensated digital signal.

In some embodiments of any of the above apparatus, the apparatus further comprises a wavelength demultiplexer (e.g., 140, FIG. 1) configured to generate the optical communication signal by demultiplexing a corresponding WDM signal (e.g., 132, FIG. 1).

In some embodiments of any of the above apparatus, the signal processor comprises a multiple-input/multiple-output equalizer (e.g., 330, FIG. 3) configured to perform electronic polarization demultiplexing, said electronic polarization demultiplexing being a part of the equalization processing applied to the first dispersion-compensated digital signal.

In some embodiments of any of the above apparatus, the signal processor comprises a carrier-recovery module (e.g., 340, FIG. 3) configured to perform at least one of (i) compensating a frequency mismatch between carrier frequencies of the optical communication signal and an optical local-oscillator signal (e.g., 212, FIG. 2) and (ii) reducing phase noise, said at least one being a part of the equalization processing applied to the first dispersion-compensated digital signal.

In some embodiments of any of the above apparatus, the signal processor comprises a multiple-input/multiple-output equalizer (e.g., 470, FIG. 4C) configured to perform electronic polarization demultiplexing, said electronic polarization demultiplexing being a part of the equalization processing applied to the dispersed digital signal.

In some embodiments of any of the above apparatus, the signal processor further comprises an electronic controller (e.g., 460, FIG. 4C) operatively connected to cause the multiple-input/multiple-output equalizer to perform the electronic polarization demultiplexing in a decision-aided manner (e.g., in accordance with Eqs. (3)-(4)).

In some embodiments of any of the above apparatus, the multiple-input/multiple-output equalizer comprises four finite-impulse-response filters (e.g., $472_1$-$472_4$, FIG. 4C) operatively connected in a butterfly configuration.

In some embodiments of any of the above apparatus, the signal processor comprises two or more serially connected equalization stages (e.g., $410_1$-$410_M$, FIGS. 4A-4B) configured to perform the dispersion-application processing, each of the equalization stages being configured to apply (e.g., using respective 440, FIG. 4B) a respective fraction (e.g., $CD_m$, Eq. (2)) of a total dispersion amount (e.g., $CD_t$, Eq. (2)), the total dispersion amount representing a dispersion amount distorting the optical communication signal.

In some embodiments of any of the above apparatus, each of the two or more serially connected equalization stages comprises a respective multiple-input/multiple-output equalizer (e.g., 470, FIG. 4C) configured to perform electronic polarization demultiplexing on respective dispersed digital signals (e.g., $442_2$ and $442_4$, FIGS. 4B-4C) generated by the equalization stage using the respective fraction of the total dispersion amount.

In some embodiments of any of the above apparatus, the signal processor is configured to generate the first dispersion-compensated digital signal by causing the dispersion-compensation processing performed on the digital samples to compensate the total dispersion amount.

In some embodiments of any of the above apparatus, the signal processor comprises a first dispersion-compensation module (e.g., 320, FIG. 3) configured to generate the first dispersion-compensated digital signal by causing the dispersion-compensation processing performed on the digital samples to compensate the total dispersion amount.

In some embodiments of any of the above apparatus, the signal processor further comprises a second dispersion-compensation module (e.g., 420, FIG. 4A) configured to perform dispersion-compensation processing on the second equalized digital signal to generate a second dispersion-compensated digital signal (e.g., 352, FIG. 4A).

In some embodiments of any of the above apparatus, the signal processor is further configured to recover data encoded in the optical communication signal using the second dispersion-compensated digital signal.

In some embodiments of any of the above apparatus, the two or more serially connected equalization stages are configured to apply a back-propagation algorithm to the first equalized digital signal.

In some embodiments of any of the above apparatus, the signal processor comprises: an equalizer (e.g., 470, FIG. 4C) configured to perform the equalization processing applied to the dispersed digital signal; a decision circuit (e.g., 430, FIG. 4B) configured to map complex values carried by the first equalized digital onto a constellation to generate a corresponding sequence of complex values (e.g., 432, FIG. 4B), each representing a respective constellation symbol of the constellation; and an electronic controller (e.g., 460, FIG. 4C) operatively connected to cause the equalizer to perform the equalization processing applied to the dispersed digital signal in a decision-aided manner, using the corresponding sequence of complex values.

In some embodiments of any of the above apparatus, the signal processor further comprises a first dispersion-application module (e.g., $440_1$, FIG. 4B) operatively connected between the decision circuit and the electronic controller and configured to apply dispersion-application processing to the corresponding sequence of complex values to generate a transformed sequence of complex values (e.g., $442_1$, FIG. 4B); and wherein the electronic controller is configured to cause the equalizer to perform the equalization processing applied to the dispersed digital signal in the decision-aided manner, using the transformed sequence of complex values.

In some embodiments of any of the above apparatus, the signal processor further comprises a second dispersion-application module (e.g., $440_2$, FIG. 4B) operatively connected to the electronic controller and the equalizer (e.g., as indicated in FIGS. 4B-4C) and configured to perform the dispersion-application processing on the first equalized digital signal to generate the dispersed digital signal.

According to another example embodiment disclosed above in reference to FIGS. 1-4, provided is a machine-implemented signal-processing method comprising the steps of: performing dispersion-compensation processing (e.g., using 320, FIG. 3) on digital samples (e.g., 312, FIG. 3) representing an optical communication signal to generate a first dispersion-compensated digital signal (e.g., 322, FIG. 3); applying equalization processing (e.g., using 330/340, FIG. 3) to the first dispersion-compensated digital signal to generate a first equalized digital signal (e.g., 342, FIG. 3); performing dispersion-application processing (e.g., using 440, FIG. 4B) on the first equalized digital signal to generate a dispersed digital signal (e.g., 442, FIG. 4B); and applying equalization processing (e.g., using 450, FIG. 4B) to the dispersed digital signal to generate a second equalized digital signal (e.g., 412, FIG. 4A).

In some embodiments of the above method, the method further comprises recovering data (e.g., using 360, FIG. 3) encoded in the optical communication signal using the second equalized digital signal.

In some embodiments of any of the above methods, the method further comprises performing dispersion-compensation processing (e.g., using 420, FIG. 4) on the second equalized digital signal to generate a second dispersion-compensated digital signal (e.g., 352, FIG. 3).

In some embodiments of any of the above methods, the method further comprises generating the optical communication signal by wavelength-demultiplexing a corresponding WDM signal (e.g., 132, FIG. 1).

In some embodiments of any of the above methods, the equalization processing applied to the first dispersion-compensated digital signal comprises electronic polarization demultiplexing.

In some embodiments of any of the above methods, the equalization processing applied to the first dispersion-compensated digital signal comprises at least one of (i) compensating a frequency mismatch between carrier frequencies of the optical communication signal and an optical local-oscillator signal (e.g., 212, FIG. 2) and (ii) reducing phase noise.

In some embodiments of any of the above methods, the equalization processing applied to the dispersed digital signal comprises electronic polarization demultiplexing.

While this disclosure includes references to illustrative embodiments, this specification is not intended to be construed in a limiting sense.

Although embodiments are described above in reference to processing PDM signals, the invention(s) disclosed herein are not so limited. For example, some embodiments can be used to process non-PDM signals or signals wherein each polarization carries the same data and/or constellation symbols as the other polarization.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
   an optical front-end circuit configured to receive an optical communication signal; and
   a signal processor electrically connected to the optical front-end circuit; and
   wherein the signal processor comprises:
      a first dispersion-compensation module configured to perform dispersion-compensation processing on digital samples representing the optical communication signal to generate a first dispersion-compensated digital signal;
      a first equalizer circuit configured to apply equalization processing to the first dispersion-compensated digital signal to generate a first equalized digital signal; and
      a second equalizer circuit configured to:
         perform dispersion-application processing on the first equalized digital signal to generate a dispersed digital signal; and
         apply equalization processing to the dispersed digital signal to generate a second equalized digital signal.

2. The apparatus of claim 1, wherein the signal processor is configured to recover data encoded in the optical communication signal using the second equalized digital signal.

3. The apparatus of claim 1, wherein the signal processor is configured to perform dispersion-compensation processing on the second equalized digital signal to generate a second dispersion-compensated digital signal.

4. The apparatus of claim 3, wherein the signal processor is further configured to recover data encoded in the optical communication signal using the second dispersion-compensated digital signal.

5. The apparatus of claim 1, further comprising a wavelength demultiplexer configured to generate the optical communication signal by demultiplexing a corresponding WDM signal.

6. The apparatus of claim 1, wherein the first equalizer circuit comprises a multiple-input/multiple-output equalizer configured to perform electronic polarization demultiplexing, said electronic polarization demultiplexing being a part of the equalization processing applied to the first dispersion-compensated digital signal.

7. The apparatus of claim 1, wherein the signal processor comprises a carrier-recovery module configured to perform at least one of (i) compensating a frequency mismatch between carrier frequencies of the optical communication signal and an optical local-oscillator signal and (ii) reducing phase noise, said at least one being a part of the equalization processing applied to the first dispersion-compensated digital signal.

8. The apparatus of claim 1, wherein the second equalizer circuit comprises a multiple-input/multiple-output equalizer configured to perform electronic polarization demultiplexing, said electronic polarization demultiplexing being a part of the equalization processing applied to the dispersed digital signal.

9. The apparatus of claim 8, wherein the signal processor further comprises an electronic controller operatively connected to cause the multiple-input/multiple-output equalizer to perform the electronic polarization demultiplexing in a decision-aided manner.

10. The apparatus of claim 8, wherein the multiple-input/multiple-output equalizer comprises four finite-impulse-response filters operatively connected in a butterfly configuration.

11. The apparatus of claim 1, wherein the second equalizer circuit comprises two or more serially connected equalization stages configured to perform the dispersion-application processing, each of the equalization stages being configured to apply a respective fraction of a total dispersion amount, the total dispersion amount representing a dispersion amount distorting the optical communication signal.

12. The apparatus of claim 11, wherein each of the two or more serially connected equalization stages comprises a respective multiple-input/multiple-output equalizer configured to perform electronic polarization demultiplexing on respective dispersed digital signals generated by the equalization stage using the respective fraction of the total dispersion amount.

13. The apparatus of claim 11, wherein the first dispersion-compensation module is configured to generate the first dispersion-compensated digital signal by causing the dispersion-compensation processing performed on the digital samples to compensate the total dispersion amount.

14. The apparatus of claim 13, wherein the signal processor further comprises a second dispersion-compensation module configured to perform dispersion-compensation processing on the second equalized digital signal to generate a second dispersion-compensated digital signal.

15. The apparatus of claim 14, wherein the signal processor is further configured to recover data encoded in the optical communication signal using the second dispersion-compensated digital signal.

16. The apparatus of claim 11, wherein the two or more serially connected equalization stages are configured to apply a back-propagation algorithm to the first equalized digital signal.

17. The apparatus of claim 1, wherein the second equalizer circuit comprises:
   an equalizer configured to perform the equalization processing applied to the dispersed digital signal;
   a decision circuit configured to map complex values carried by the first equalized digital onto a constellation to generate a corresponding sequence of complex values, each of the complex values representing a respective constellation symbol of the constellation; and
   an electronic controller operatively connected to cause the equalizer to perform the equalization processing applied to the dispersed digital signal in a decision-aided manner, using the corresponding sequence of complex values.

18. The apparatus of claim 17,
   wherein the second equalizer circuit further comprises a first dispersion-application module operatively connected between the decision circuit and the electronic controller and configured to apply dispersion-application processing to the corresponding sequence of complex values to generate a transformed sequence of complex values; and
   wherein the electronic controller is configured to cause the equalizer to perform the equalization processing applied to the dispersed digital signal in the decision-aided manner, using the transformed sequence of complex values.

19. The apparatus of claim 18, wherein the second equalizer circuit further comprises a second dispersion-application module operatively connected to the electronic controller and the equalizer and configured to perform the dispersion-application processing on the first equalized digital signal to generate the dispersed digital signal.

20. A machine-implemented signal-processing method comprising:
  performing dispersion-compensation processing on digital samples representing an optical communication signal to generate a first dispersion-compensated digital signal;
  applying equalization processing to the first dispersion-compensated digital signal to generate a first equalized digital signal;
  performing dispersion-application processing on the first equalized digital signal to generate a dispersed digital signal; and
  applying equalization processing to the dispersed digital signal to generate a second equalized digital signal.

21. The method of claim 20, wherein the dispersion-application processing comprises applying to the first equalized digital signal a digital transformation that introduces a signal distortion that approximates a signal distortion caused by chromatic dispersion, the dispersed digital signal being a digital signal generated using said digital transformation.

22. The apparatus of claim 1, wherein the second equalizer circuit is configured to perform the dispersion-application processing by applying to the first equalized digital signal a digital transformation that introduces a signal distortion that approximates a signal distortion caused by chromatic dispersion, the dispersed digital signal being a digital signal generated using said digital transformation.

* * * * *